United States Patent
Hasaba et al.

(10) Patent No.: US 11,569,689 B2
(45) Date of Patent: Jan. 31, 2023

(54) POWER RECEIVING DEVICE, POWER TRANSMITTING DEVICE, AND UNDERWATER POWER SUPPLY SYSTEM

(71) Applicant: PANASONIC INTELLECTUAL PROPERTY MANAGEMENT CO., LTD., Osaka (JP)

(72) Inventors: Ryosuke Hasaba, Kanagawa (JP); Kazuhiro Eguchi, Fukuoka (JP); Yoshio Koyanagi, Kanagawa (JP); Katsuya Okamoto, Fukuoka (JP); Souichi Kawata, Fukuoka (JP); Tatsuo Yagi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/264,203

(22) PCT Filed: Jun. 7, 2019

(86) PCT No.: PCT/JP2019/022827
§ 371 (c)(1),
(2) Date: May 27, 2021

(87) PCT Pub. No.: WO2020/026592
PCT Pub. Date: Feb. 6, 2020

(65) Prior Publication Data
US 2021/0305846 A1    Sep. 30, 2021

(30) Foreign Application Priority Data
Jul. 31, 2018  (JP) .............................. JP2018-144125

(51) Int. Cl.
*H02J 50/12* (2016.01)
*H01F 27/24* (2006.01)
*H01F 27/28* (2006.01)

(52) U.S. Cl.
CPC .............. *H02J 50/12* (2016.02); *H01F 27/24* (2013.01); *H01F 27/28* (2013.01)

(58) Field of Classification Search
CPC ........ H02J 50/12; H02J 2310/42; H02J 50/50; H01F 27/24; H01F 27/28; H01F 27/366; H01F 38/14; B63G 8/00
See application file for complete search history.

(56) References Cited

U.S. PATENT DOCUMENTS 8,583,227 B2 * 11/2013 Savage .................. A61B 5/053
                                                          607/60
9,426,588 B2 *  8/2016 Vonlanthen .............. H01Q 7/00
(Continued)

FOREIGN PATENT DOCUMENTS

| CN | 108407635 A | * | 8/2018 |
| JP | 2005-102101 | | 4/2005 |

(Continued)

OTHER PUBLICATIONS

Written Opinion of the International Searching Authority issued in International Pat. Appl. No. PCT/JP2019/022827, dated Jul. 30, 2019.
(Continued)

*Primary Examiner* — Pinping Sun
(74) *Attorney, Agent, or Firm* — Greenblum & Bernstein, P.L.C.

(57) ABSTRACT

A power receiving device is disposed underwater. The power receiving device includes a housing formed of a weak magnetic material, a ferromagnetic body that surrounds an outer side of the housing and is formed of a ferromagnetic (Continued)

material, and a power receiving coil wound around an outer side of the ferromagnetic body.

5 Claims, 10 Drawing Sheets

(56) References Cited

U.S. PATENT DOCUMENTS

| | | | | |
|---|---|---|---|---|
| 9,478,991 B2* | 10/2016 | Weissentern | | H02J 50/12 |
| 9,647,483 B1* | 5/2017 | Bana | | H02J 7/025 |
| 2005/0057422 A1 | 3/2005 | Deguchi et al. | | |
| 2010/0145149 A1 | 6/2010 | Yoshida et al. | | |
| 2012/0032523 A1* | 2/2012 | Overton | | H02J 50/80 |
| | | | | 307/104 |
| 2013/0015699 A1* | 1/2013 | Mita | | B60L 53/126 |
| | | | | 307/104 |
| 2013/0037365 A1* | 2/2013 | Ichikawa | | B60L 53/126 |
| | | | | 191/10 |
| 2014/0091756 A1 | 4/2014 | Ofstein et al. | | |
| 2014/0232200 A1 | 8/2014 | Maekawa | | |
| 2014/0265621 A1* | 9/2014 | Wong | | H01F 38/14 |
| | | | | 307/104 |
| 2015/0008877 A1* | 1/2015 | Ichikawa | | H02J 50/70 |
| | | | | 320/108 |
| 2015/0137925 A1 | 5/2015 | Abe et al. | | |
| 2015/0222128 A1* | 8/2015 | Hansen | | H02J 50/70 |
| | | | | 307/104 |
| 2015/0328995 A1* | 11/2015 | Konno | | B60L 53/126 |
| | | | | 320/108 |
| 2015/0357828 A1* | 12/2015 | Ichikawa | | H02J 5/005 |
| | | | | 307/104 |
| 2016/0087331 A1* | 3/2016 | Heppell | | H01Q 7/00 |
| | | | | 343/702 |
| 2017/0093198 A1* | 3/2017 | Graham | | H04B 5/0081 |
| 2017/0207658 A1* | 7/2017 | Bana | | H02J 50/00 |
| 2019/0081496 A1 | 3/2019 | Itagaki et al. | | |
| 2019/0229557 A1 | 7/2019 | Deguchi et al. | | |
| 2019/0334380 A1 | 10/2019 | Koyanagi et al. | | |

FOREIGN PATENT DOCUMENTS

| | | | | |
|---|---|---|---|---|
| JP | 2006/149687 | | 6/2006 | |
| JP | 2008-043125 | | 2/2008 | |
| JP | 2010/125286 | | 6/2010 | |
| JP | 2013/175673 | | 9/2013 | |
| JP | 2015-015901 | | 1/2015 | |
| JP | 2015084366 A | * | 4/2015 | |
| JP | 2018-007400 | | 1/2018 | |
| JP | 2018/074760 | | 5/2018 | |
| KR | 101371964 B1 | * | 3/2014 | |
| WO | WO-2009123432 A2 | * | 10/2009 | H01F 27/263 |
| WO | 2013/183665 | | 12/2013 | |
| WO | 2017/037811 | | 3/2017 | |
| WO | WO-2018003568 A1 | * | 1/2018 | B60L 53/12 |
| WO | WO-2018079082 A1 | * | 5/2018 | B60L 53/12 |

OTHER PUBLICATIONS

International Search Report issued in International Pat. Appl. No. PCT/JP2019/022827, dated Jul. 30, 2019, along with an English translation thereof.

* cited by examiner

[Figure 3]
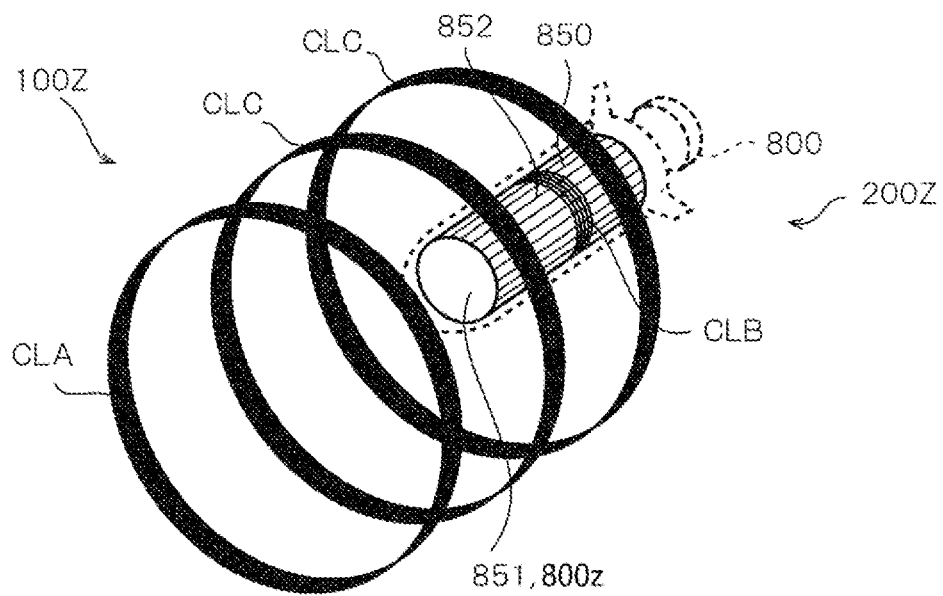
[Figure 4]
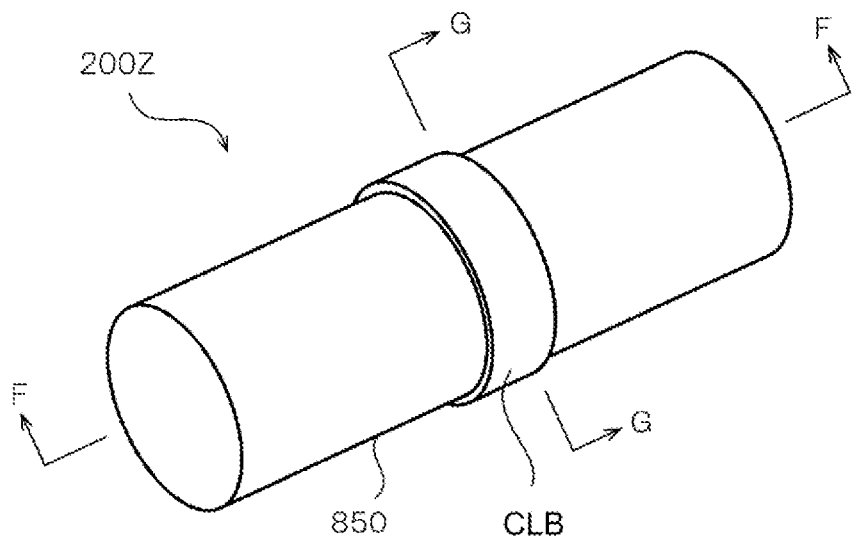

FIG. 9

| COUPLING COEFFICIENT | WITH FERRITE ABOUT 0.27 | | | WITHOUT FERRITE ABOUT 0.02 | | |
|---|---|---|---|---|---|---|
| | COIL | INDUCTANCE | Q FACTOR | COIL | INDUCTANCE | Q FACTOR |
| CLA | L1 | 414 μH | 55 | L1 | ABOUT 400 μH | ABOUT 55 |
| CLC | L2 | 408 μH | 56 | L2 | ABOUT 400 μH | ABOUT 55 |
| CLC | L3 | 453 μH | 54 | L3 | ABOUT 400 μH | ABOUT 55 |
| CLB | L4 | 291 μH | 69 | L4 | ABOUT 40 μH | 10 OR LESS |

Tb

POWER RECEIVING DEVICE, POWER TRANSMITTING DEVICE, AND UNDERWATER POWER SUPPLY SYSTEM

TECHNICAL FIELD

The present disclosure relates to a power receiving device that receives electric power underwater, a power transmitting device that transmits electric power underwater, and an underwater power supply system.

BACKGROUND ART

In related art, there is known an underwater base station as a power transmitting device that wirelessly transmits electric power to an underwater vehicle serving as a power receiving device by means of a magnetic resonance (see Patent Literature 1, for example). The power transmitting device includes a power transmitting resonance coil, a balloon, and a balloon control mechanism. The power transmitting resonance coil wirelessly transmits electric power to a power receiving resonance coil of the power receiving device by a magnetic field resonance method. The balloon internally houses the power transmitting resonance coil. The balloon control mechanism removes water between the power transmitting resonance coil and the power receiving resonance coil by inflating the balloon during power transmission.

In addition, in related art, there is known an antenna device that transmits electric power and data to an IC-integrated medium by means of an electromagnetic induction using a 13.56 MHz frequency band (see Patent Literature 2, for example). The antenna device includes at least one power-fed loop antenna to which a signal current is fed and at least one non-power-fed loop antenna to which no signal current is fed. The antenna device generates a signal current in the non-power-fed loop antenna using a magnetic field generated by the power-fed loop antenna, and expands a communication range of the power-fed loop antenna.

CITATION LIST

Patent Literature

Patent Literature 1: JP-A-2015-015901
Patent Literature 2: JP-A-2005-102101

SUMMARY OF INVENTION

Technical Problem

Aluminum, which is a weak magnetic body (non-magnetic body), is usually used for a housing of a power receiving device that receives electric power underwater, such as an autonomous underwater vehicle (AUV) that is an underwater vehicle. When a power receiving coil is formed by winding a wire around a side surface of the housing, an inductance decreases and a Q factor decreases due to conductivity of aluminum that is a weak magnetic body. Since the conductivity of aluminum is high, an eddy current is generated due to a magnetic field, and the housing generates heat.

The present disclosure has been made in view of the circumstances described above, and provides a power receiving device, a power transmitting device, and an underwater power supply system capable of preventing a decrease in transmission efficiency of a wireless underwater power transmission even when the power receiving device includes a weak magnetic housing.

Solution to Problem

According to an aspect of the present disclosure, there is provided a power receiving device disposed underwater, the power receiving device including a housing formed of a weak magnetic material, a magnetic body that surrounds an outer side of the housing and is formed of a ferromagnetic material, and a power receiving coil wound around an outer side of the magnetic body.

According to an aspect of the present disclosure, there is provided a power transmitting device configured to transmit electric power to a power receiving device including a housing formed of a weak magnetic material underwater, the power transmitting device including one or more transmitting coils including a power transmitting coil configured to transmit electric power to a power receiving coil of the power receiving device via a magnetic field, and a magnetic body that surrounds an outer side of the transmitting coils in a radial direction and is formed of a ferromagnetic material.

According to an aspect of the present disclosure, there is provided an underwater power supply system including a power transmitting device and a power receiving device, wherein the power transmitting device disposed underwater is configured to supply electric power to the power receiving device, wherein the power receiving device includes a housing formed of a weak magnetic material, a first magnetic body that surrounds an outer side of the housing and is formed of a ferromagnetic material, and a power receiving coil wound around an outer side of the first magnetic body, and wherein the power transmitting device includes one or more transmitting coils including a power transmitting coil configured to transmit electric power to the power receiving coil of the power receiving device via a magnetic field, and a second magnetic body that surrounds an outer side of the transmitting coils in a radial direction and is formed of a magnetic material.

Advantageous Effects of Invention

According to the present invention, it is possible to prevent a decrease in transmission efficiency and prevent a housing from generating heat in a wireless underwater power transmission even when a power receiving device includes a weak magnetic housing.

BRIEF DESCRIPTION OF DRAWINGS

FIG. 3 is a perspective view showing a positional relationship between a power transmitting coil structure and a power receiving coil structure during a wireless power supply.

FIG. 4 is a perspective view showing an external appearance of the power receiving coil structure.

FIG. 9 is a diagram showing a parameter table indicating performance of a power transmitting coil, two relay coils, and a power receiving coil.

DESCRIPTION OF EMBODIMENTS

Hereinafter, a power transmitting system, specifically, a power receiving device, a power transmitting device, and an underwater power supply system according to an embodiment (hereinafter, referred to as "the present embodiment") according to the present disclosure will be described in detail with reference to the drawings as appropriate. An unnecessarily detailed description may be omitted. For example, a detailed description of a well-known matter or a repeated description of substantially the same configuration may be omitted. This is to avoid unnecessary redundancy in a following description and to facilitate understanding for those skilled in the art. The accompanying drawings and the following descriptions are provided for those skilled in the art to have a thorough understanding of the present disclosure, and are not intended to limit a subject matter recited in the claims.

Introduction to Embodiment of Present Disclosure

When electric power is transmitted under seawater by means of a magnetic resonance, since seawater has high conductivity, attenuation of an electromagnetic field is large. Therefore, it is considered to cover a power receiving coil with a medium (for example, air) that contributes to little attenuation of an electromagnetic field. However, even when the power receiving coil is covered with a medium that contributes to little attenuation of an electromagnetic field, it is difficult to fairly reduce the attenuation of the electromagnetic field, or a large space is required in order to surround the power receiving coil. For example, in the following embodiment, a core (magnetic core) is provided in the power receiving coil, and an electromagnetic field is concentrated in the core, so that attenuation of the electromagnetic field underwater (for example, under seawater) is reduced.

Figure 1:
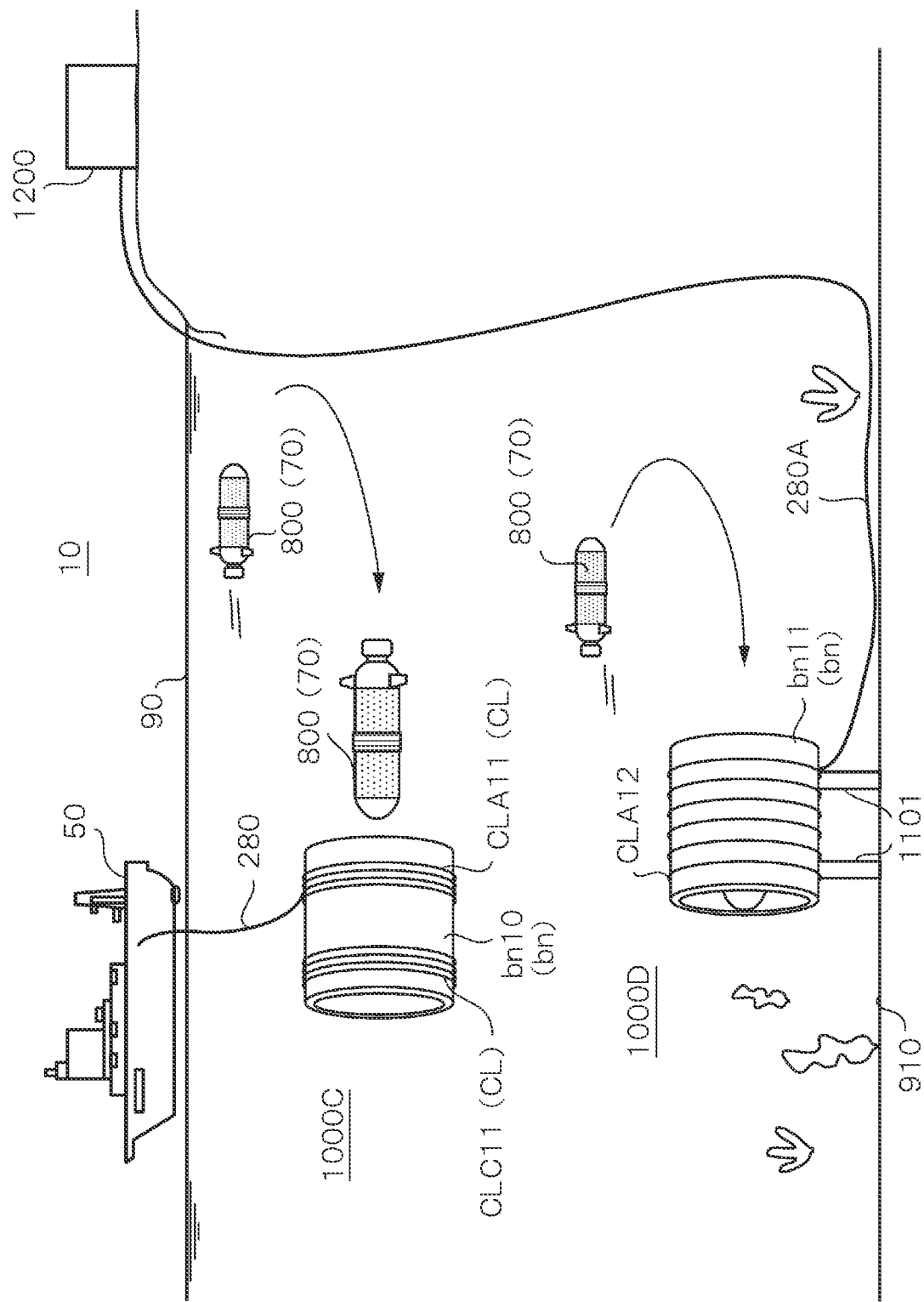
FIG. 1 is a diagram showing an example of an environment in which a power transmitting system according to an embodiment is disposed.

FIG. 1 is a diagram showing an example of an environment in which a power transmitting system 10 according to the present embodiment is disposed. The power transmitting system 10 includes a power transmitting device 100, a power receiving device 200, and a plurality of coils CL (see FIG. 2). The power transmitting device 100 transmits wirelessly (without contacting) electric power to the power receiving device 200 via the plurality of coils CL by means of a magnetic resonance. The number of coils CL is n and can be freely set.

Each of the coils CL is formed into, for example, an annular shape, and is insulated by being covered with a resin cover. The coil CL may be formed of, for example, a cabtire cable. The coil CL may be a helical coil, a spiral coil, or the like. The helical coil is an annular coil that is wound not in the same plane and is spirally wound (formed by helical winding) along a power transmission direction (also simply referred to as a "transmission direction") by means of a magnetic resonance. The spiral coil is an annular coil wound in the same plane (formed by spiral winding). If the coil CL is a spiral coil, a thickness of the coil CL can be reduced when it is difficult to ensure the thickness of the coil CL. If the coil CL is a helical coil, a large space inside the wound coil CL can be ensured. For example, a spiral coil is used in FIG. 1.

The coils CL include a power transmitting coil CLA and a power receiving coil CLB. The power transmitting coil CLA is a primary coil, and the power receiving coil CLB is a secondary coil. The coils CL may include one or more relay coils CLC (booster coils) disposed between the power transmitting coil CLA and the power receiving coil CLB. The relay coils CLC are arranged substantially parallel to one another, and a half or more of opening surfaces formed by the relay coils CLC overlap one another. An interval between a plurality of relay coils CLC is ensured to be equal to or larger than a radius of the relay coil CLC or the like. The relay coils CLC assist power transmission performed by the power transmitting coil CLA.

The power transmitting coil CLA is provided in the power transmitting device 100. The power receiving coil CLB is provided in the power receiving device 200. The relay coils CLC may be provided in the power transmitting device 100, may be provided in the power receiving device 200, or may be provided separately from the power transmitting device 100 and the power receiving device 200. Alternatively, a part of the relay coils CLC may be provided in the power transmitting device 100, and the other relay coils CLC may be provided in the power receiving device 200.

A part of the power transmitting device 100 may be provided in a vessel 50, the other part of the power transmitting device 100 may be provided in, for example, a power supply facility 1200 installed on land. The power receiving device 200 may be installed in a movable underwater vehicle 60 (for example, a submarine 70 or an underwater excavator 80) or a power receiving device (for example, a seismometer, a monitoring camera, or a geothermal generator) that is fixedly installed. The submarine 70 is shown as the underwater vehicle 60 in FIG. 1. The coils CL are disposed underwater (for example, under seawater).

Examples of the submarine 70 include a remotely operated vehicle (ROV), an unmanned underwater vehicle (UUV), and an autonomous underwater vehicle (AUV) 800. Here, a case where the AUV 800 is used as the submarine 70 will be described in detail.

A part of the vessel 50 is present above a water surface 90 (for example, sea level), that is, on the water, and the other part of the vessel 50 is present below the water surface 90, that is, underwater. The vessel 50 can move on the water, and for example, can freely move on the water to a data acquisition place. The power transmitting device 100 installed in the vessel 50 and the power transmitting coil CLA are connected to each other by a power cable 280. The power cable 280 is connected to, for example, a driver 151 (see FIG. 2) in the power transmitting device 100 via a connector on the water.

The AUV 800 travels underwater. For example, the AUV 800 can freely move to a data acquisition point in accordance with an instruction from the vessel 50 on the water. The instruction from the vessel 50 may be transmitted by communication via the coils CL, or may be transmitted using other communication methods.

The coils CL are arranged, for example, at equal intervals. A distance (coil interval) between adjacent coils CL is, for example, 5 m. For example, the coil interval has a length equal to about half of a diameter of a coil CL. A transmission frequency is, for example, 40 kHz or less and is preferably less than 10 kHz in consideration of attenuation of a magnetic field strength underwater (for example, under seawater). When electric power is transmitted at a transmission frequency of 10 kHz or more, it is required to perform a predetermined simulation based on provisions of the Radio Act, and when the transmission frequency is less than 10 kHz, the simulation can be omitted. When the transmission frequency becomes lower, a power transmission distance becomes longer, the coil CL becomes larger, and the coil interval becomes larger. For example, when communication signals are superimposed, the transmission frequency may be a frequency higher than 40 kHz.

The transmission frequency is determined based on coil characteristics such as an inductance of the coil CL, a diameter of the coil CL, and the number of turns of the coil CL. The diameter of the coil CL is, for example, several meters to several tens of meters. When a thickness of the coil CL increases, that is, when a wire diameter of the coil CL increases, electrical resistance in the coil CL decreases, and an electric power loss decreases. Electric power transmitted via the coil CL is, for example, 50 W or more, and may be on the order of kW.

The power transmitting device 100 may include one or more bobbins bn around which a wire of a coil is wound. A material of the bobbin bn may be a non-conductive or weak magnetic material, and may use, for example, a resin such as polyvinyl chloride, acrylic, and polyester. The material of the bobbin may have a dielectric property. For example, when polyvinyl chloride is used as the material of the bobbin, the bobbin is inexpensive, easy to obtain, and easy to process. Since the bobbin bn is non-conductive, a magnetic field generated due to an alternating current flowing through the coil CL can be prevented from being absorbed by the bobbin bn in the power transmitting device 100.

In FIG. 1, in order to supply electric power underwater (for example, supply electric power under seawater), there are provided a power supply stand 1000C including a bobbin bn10 that floats underwater and a power supply stand 1000D including a bobbin bn11 disposed on a seabed.

In the power supply stand 1000C, a power transmitting coil CLA11 and a relay coil CLC11 are wound around an outer circumference of the cylindrical bobbin bn10. The power cable 280 is connected to the power transmitting coil CLA11, and electric power is supplied, via the power cable 280, to the power transmitting coil CLA11 from the vessel 50 mooring on the sea. The power cable 280 supports the power supply stand 1000C in a floating state in the sea. In the floating state, openings on two sides of the cylindrical bobbin bn10 may be oriented in a horizontal direction. The AUV 800 may enter, in the horizontal direction, an entrance and exit of the power supply stand 1000C in the floating state and may stay inside the bobbin bn10 to receive electric power.

The power supply stand 1000D is fixed to upper portions of two pillars 1101 embedded in a seabed 910. An entrance and exit of the power supply stand 1000D may be oriented in the horizontal direction. In the power supply stand 1000D, a power transmitting coil CLA12 is wound around the cylindrical bobbin bn11, and a relay coil CLC is not provided. A power cable 280A extending along the seabed 910 may be connected to the power transmitting coil CLA12, and electric power may be supplied from the power supply facility 1200 to the power transmitting coil CLA12 via the power cable 280A. The AUV 800 may enter, in the horizontal direction, the entrance and exit of the power supply stand 1000D installed on the seabed 910 and may stay inside the bobbin bn11 to receive electric power.

Figure 2:
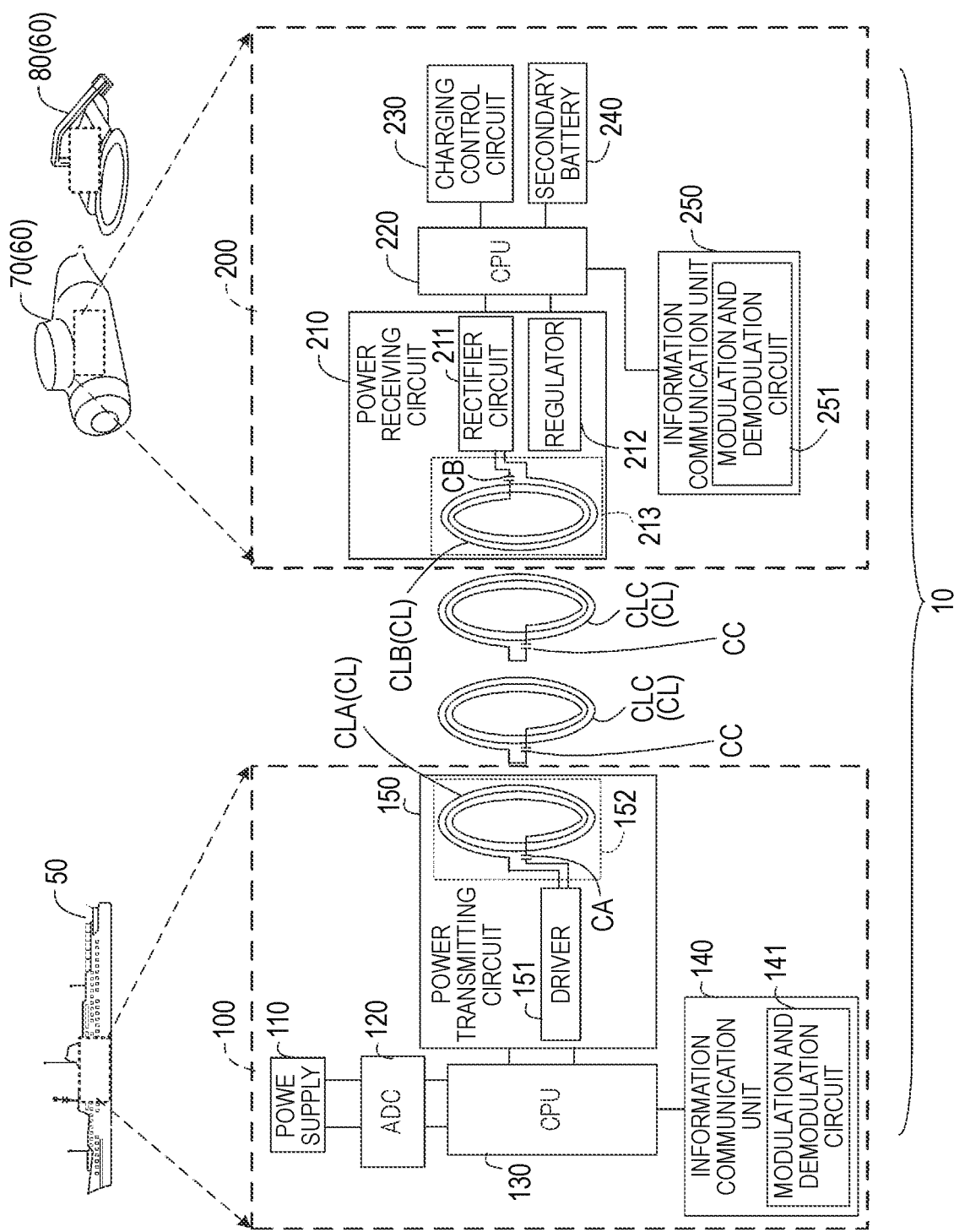
FIG. 2 is a block diagram showing a configuration example of the power transmitting system.

FIG. 2 is a block diagram showing a configuration example of the power transmitting system 10. As described above, the power transmitting system 10 includes the power transmitting device 100 and the power receiving device 200. The power transmitting device 100 includes a power supply 110, an AC/DC converter (ADC) 120, a central processing unit (CPU) 130, an information communication unit 140, and a power transmitting circuit 150.

The ADC 120 converts alternating current power supplied from the power supply 110 into direct current power. The direct current power is transmitted to the power transmitting circuit 150.

The CPU 130 (an example of a processor) controls an operation of each unit (for example, the power supply 110, the ADC 120, the information communication unit 140, and the power transmitting circuit 150) of the power transmitting device 100.

The information communication unit 140 includes a modulation and demodulation circuit 141 for modulating or demodulating communication data exchanged between the information communication unit 140 and the power receiving device 200. For example, the information communication unit 140 transmits control information from the power transmitting device 100 to the power receiving device 200 via the coil CL. For example, the information communication unit 140 receives data from the power receiving device 200 to the power transmitting device 100 via the coil CL. The data includes, for example, data of an exploration result obtained by underwater exploration or bottom exploration performed by the power receiving device 200. The information communication unit 140 allows the underwater vehicle 60 to perform work such as data collection and can quickly exchange data with an underwater vehicle.

The power transmitting circuit 150 includes the driver 151 and a resonance circuit 152. The driver 151 converts direct current power from the ADC 120 into an alternating current voltage (pulse waveform) of a predetermined frequency. The resonance circuit 152 includes a capacitor CA and a power transmitting coil CLA, and generates an alternating current voltage having a sinusoidal waveform based on the alternating current voltage having a pulse waveform from the driver 151. The power transmitting coil CLA resonates at a predetermined resonance frequency in accordance with the alternating current voltage applied from the driver 151. The power transmitting coil CLA is impedance-matched to an output impedance of the power transmitting device 100.

A predetermined frequency related to the alternating current voltage obtained by a conversion performed by the driver 151 corresponds to a transmission frequency of a power transmission between the power transmitting device 100 and the power receiving device 200, and corresponds to a resonance frequency. The transmission frequency may be set based on, for example, a Q factor of each coil CL.

The power receiving device 200 includes a power receiving circuit 210, a CPU 220, a charging control circuit 230, a secondary battery 240, and an information communication unit 250.

The power receiving circuit 210 includes a rectifier circuit 211, a regulator 212, and a resonance circuit 213. The resonance circuit 213 includes a capacitor CB and a power receiving coil CLB, and receives alternating current power transmitted from the power transmitting coil CLA. The power receiving coil CLB is impedance-matched to an input impedance of the power receiving device 200. The rectifier circuit 211 converts alternating current power induced in the power receiving coil CLB into direct current power. The regulator 212 converts a direct current voltage transmitted from the rectifier circuit 211 into a predetermined voltage suitable for charging the secondary battery 240.

The CPU 220 (an example of a processor) controls an operation of each unit (for example, the power receiving circuit 210, the charging control circuit 230, the secondary battery 240, and the information communication unit 250) of the power receiving device 200.

The charging control circuit 230 controls charging of the secondary battery 240 according to a type of the secondary battery 240. For example, when the secondary battery 240 is a lithium ion battery, the charging control circuit 230 starts to charge the secondary battery 240 at a constant voltage using direct current power from the regulator 212.

The secondary battery 240 accumulates electric power transmitted from the power transmitting device 100. The secondary battery 240 is, for example, a lithium ion battery.

The information communication unit 250 includes a modulation and demodulation circuit 251 for modulating or demodulating communication data exchanged between the information communication unit 250 and the power transmitting device 100. For example, the information communication unit 250 receives control information transmitted from the power transmitting device 100 to the power receiving device 200 via the coil CL. For example, the information communication unit 250 transmits data transmitted from the power receiving device 200 to the power transmitting device 100 via the coil CL. The data includes, for example, data of an exploration result obtained by underwater exploration or bottom exploration performed by the power receiving device 200. The information communication unit 250 allows the underwater vehicle 60 to perform work such as data collection and can quickly exchange data with the vessel 50.

Similar to the power transmitting coil CLA and the power receiving coil CLB, the relay coil CLC constitutes a resonance circuit together with a capacitor CC. That is, resonance circuits are arranged in multiple stages underwater in the present embodiment, so that electric power is transmitted by means of a magnetic resonance.

Next, power transmission from the power transmitting device 100 to the power receiving device 200 will be described. In the resonance circuit 152, when a current flows through the power transmitting coil CLA of the power transmitting device 100, a magnetic field is generated around the power transmitting coil CLA. A vibration of the generated magnetic field is transmitted to a resonance circuit including the relay coil CLC or the resonance circuit 213 including the power receiving coil CLB, and both resonance circuits resonate at the same frequency as the generated magnetic field.

In the resonance circuit including the relay coil CLC, a current is excited in the relay coil CLC due to the vibration of the magnetic field, the current flows, and a magnetic field is further generated around the relay coil CLC. A vibration of the generated magnetic field is transmitted to another resonance circuit including the relay coil CLC or the resonance circuit 213 including the power receiving coil CLB, and both resonance circuits resonate at the same frequency as the generated magnetic field.

In the resonance circuit 213, an alternating current is induced in the power receiving coil CLB due to a vibration of a magnetic field of the relay coil CLC or the power transmitting coil CLA. The induced alternating current is rectified, converted into a predetermined voltage, and used to charge the secondary battery 240.

FIG. 3 is a perspective view showing a positional relationship between a power transmitting coil structure 100Z and a power receiving coil structure 200Z during a wireless power supply underwater. The power transmitting coil structure 100Z is a structure related to a power transmitting coil provided in the power transmitting device 100, or a structure related to a power transmitting coil and a relay coil. The power receiving coil structure 200Z is a structure related to a power receiving coil provided in the power receiving device 200. The present embodiment is described mainly using under seawater as an example of underwater, and may be described underwater other than under seawater.

The power transmitting coil structure 100Z has a structure in which one power transmitting coil CLA and two relay coils CLC are arranged in a horizontal direction under seawater. Although a bobbin bn is omitted in FIG. 3, the bobbin bn may be provided or may not be provided. The number of the relay coils CLC may not be two, may be one, or may be three or more. Alternatively, the relay coils CLC may not be provided. The power transmitting coil CLA and the relay coils CLC are formed, for example, by sealing a 10-turn electric wire with a covering material (cover). The electric wire is, for example, a copper wire. The covering material may be a material (for example, rubber or resin) having insulation, elasticity, and weather resistance. The coils CL may be formed by winding a 10-turn electric wire covered with a covering material.

Inside the power transmitting coil structure 100Z, the power receiving coil structure 200Z can freely move forward and backward. The power receiving coil structure 200Z may be accommodated in a housing of the AUV 800, may be formed in a manner of covering a part of the housing of the AUV 800, or may be formed in a manner of covering the entire housing of the AUV 800. Here, a case where the power receiving coil structure 200Z is formed in a manner of covering a part of the housing of the AUV 800 is described. A hollow portion may be present inside the housing of the AUV 800. Various devices (for example, various arithmetic devices or sensors) may be disposed in the hollow portion. When a scheduled traveling position of the AUV 800 is a position in deep water, the hollow portion in the housing of the AUV 800 may be filled with oil so as to resist water pressure.

FIG. 4 is a perspective view showing an external appearance example of the power receiving coil structure 200Z. The power receiving coil structure 200Z has a structure including a core (magnetic core) 850 which is a magnetic body (ferromagnetic body) having high magnetic permeability, and a power receiving coil CLB disposed in a manner of winding around the core (magnetic core) 850. The core 850 may include an AUV housing (weak magnetic body 851) and a magnetic body (for example, a ferrite 852) wound around the housing. The core 850 may use a magnetic body (weak magnetic body) having low magnetic permeability. The core 850 may be formed by pasting a magnetic material to a side surface of a cylindrical weak magnetic body formed by simulating the housing of the AUV 800. The magnetic body may be formed into a cylindrical shape along the side surface of the cylindrical weak magnetic body, or may be formed into a sheet shape so as to be pasted to the side surface of the weak magnetic body. The magnetic body is not limited to be pasted to the side surface of the cylindrical weak magnetic body (corresponding to a side surface of the housing of the AUV 800), and may be pasted to a front surface (corresponding to a front surface of the housing of the AUV 800) and a rear surface (corresponding to a rear surface of the housing of the AUV 800) of the cylindrical weak magnetic body. The cylindrical weak magnetic body may use, for example, aluminum that is light, rust resistant, and easy to cut. The weak magnetic body is not limited to aluminum, and may use stainless steel, titanium, resin, and the like. For example, the ferrite 852 having a thickness of 2 mm is used as a magnetic material in the present embodiment. Since electricity is difficult to pass the ferrite, heat generation is little even when a magnetic field is generated. Since the ferrite is rust resistant, the ferrite can be easily handled. The magnetic material (ferromagnetic material) is not limited to ferrite, and may use a silicon steel plate, permalloy, and the like. The ferromagnetic material has higher magnetic permeability than the weak magnetic material.

When the core 850 is provided inside the power receiving coil CLB, a magnetic field generated by the power transmitting coil CLA or the relay coils CLC is concentrated inside the ferrite 852 provided in the core 850, and a magnetic flux is generated inside the ferrite 852 due to the generated magnetic field. Accordingly, most magnetic field lines are gathered inside the power receiving coil CLB in the power receiving coil structure 200Z.

As shown in FIG. 3, when the AUV 800 enters inner sides of the relay coils CLC arranged in two stages (right side in FIG. 3) and arrives at a position where the relay coils CLC arranged in two stages and the power receiving coil CLB face each other on substantially the same plane, wireless power supply is started underwater. The same applies to a case where the AUV 800 enters an inner side of the power transmitting coil CLA from a power transmitting coil CLA side instead of the relay coils CLC, and when the AUV 800 arrives at a position where the power transmitting coil CLA and the power receiving coil CLB face each other on substantially the same plane, wireless power supply is started underwater.

Figure 5:
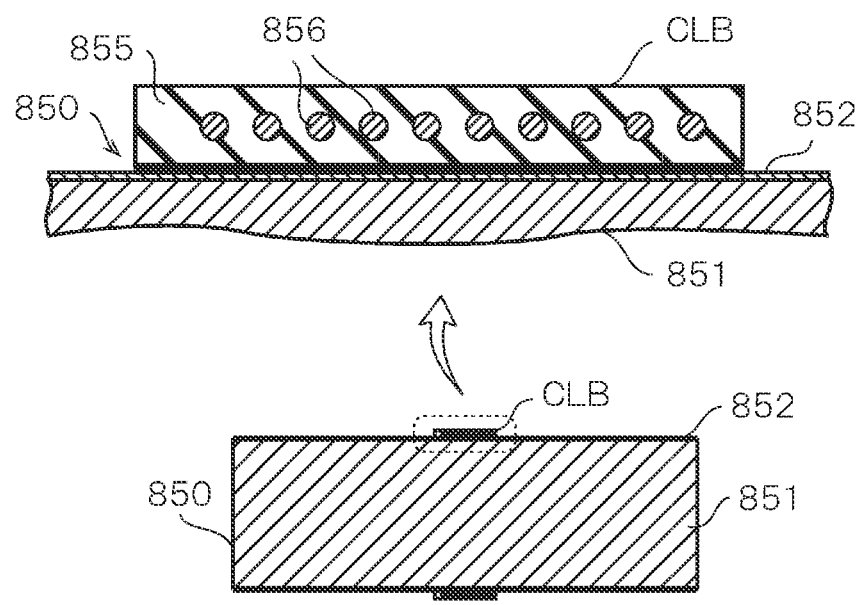
FIG. 5 is a cross sectional view showing the power receiving coil structure as viewed from a direction indicated by arrows F-F in FIG. 4 and is an enlarged view showing a part of the power receiving coil structure.
Figure 6:
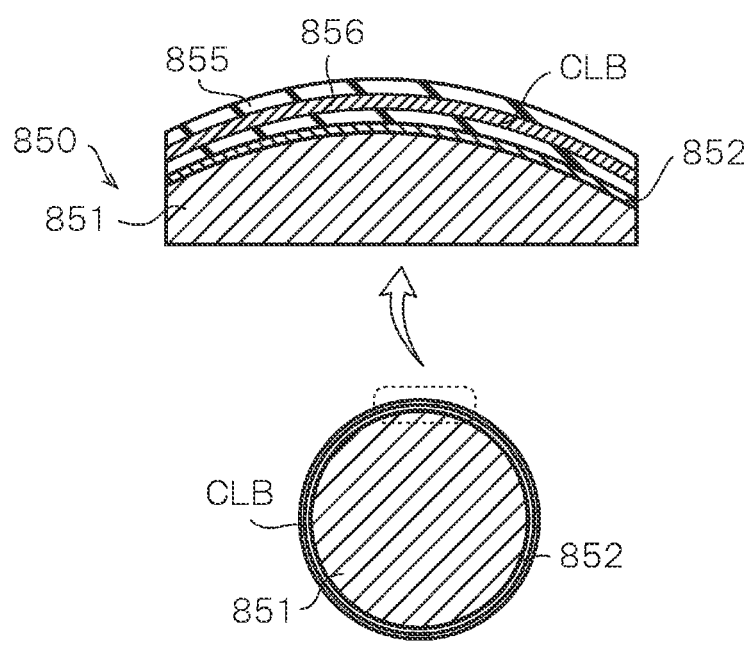
FIG. 6 is a cross sectional view showing the power receiving coil structure as viewed from a direction indicated by arrows G-G in FIG. 4 and is an enlarged view showing a part of the power receiving coil structure.

FIG. 5 is a cross sectional view showing the power receiving coil structure 200Z as viewed from a direction indicated by arrows F-F in FIG. 4 and is an enlarged view showing a part of the power receiving coil structure 200Z. FIG. 6 is a cross sectional view showing the power receiving coil structure 200Z as viewed from a direction indicated by arrows G-G in FIG. 4 and is an enlarged view showing a part of the power receiving coil structure 200Z. The power receiving coil CLB is formed by, for example, sealing a 10-turn electric wire 856 with a covering material 855. The covering material 855 may be a material having insulation, elasticity, and weather resistance. Here, the covering material 855 may use rubber. The power receiving coil structure 200Z is integrated by mounting a molded power receiving coil CLB on an outer circumference of the core 850. An adhesive may be applied to a contact surface between the outer circumference of the core 850 and the covering material 855 of the power receiving coil CLB, so that the core 850 and the power receiving coil CLB are not separated from each other. The core 850 and the power receiving coil CLB may be integrated using a method other than bonding with an adhesive.

Figure 7:
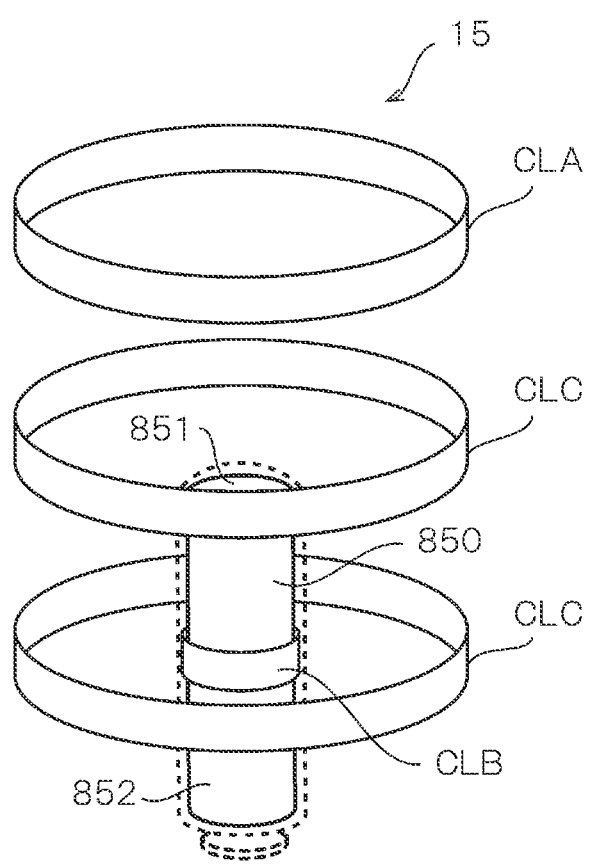
FIG. 7 is a diagram showing an example of a power transmission model for calculating inductances and Q factors of a power receiving coil, a power transmitting coil, and relay coils.

FIG. 7 is a diagram showing an example of a power transmission model 15 for calculating inductances and Q factors of the power receiving coil CLB, the power transmitting coil CLA, and the relay coils CLC. In the power transmission model 15, the relay coils CLC are arranged in two stages below the power transmitting coil CLA in the drawing. A diameter of the power transmitting coil CLA is, for example, 2000 mm, and the number of turns of the power transmitting coil CLA is, for example, 10. A diameter (wire diameter) of a conductor of the power transmitting coil CLA is, for example, 13.9 mm, and a thickness of the covering material is, for example, 2.1 mm. Therefore, a cross sectional area of the conductor is, for example, 100 $mm^2$. Specifications of the two relay coils CLC may be the same as specifications of the power transmitting coil CLA.

The power receiving coil CLB faces the relay coils CLC (the lower relay coil CLC in FIG. 7) arranged in two stages in substantially the same plane. A diameter of the power receiving coil CLB is, for example, 500 mm, and the number of turns of the power receiving coil CLB is, for example, 10. A diameter (wire diameter) of a conductor of the power receiving coil CLB is, for example, 9.1 mm, and a thickness of the covering material 855 is, for example, 3.2 mm. Therefore, a cross sectional area of the conductor is, for example, 38 $mm^2$.

A coil interval (a distance between the power transmitting coil CLA and a relay coil CLC) has a length equal to about half of a diameter of a coil CL. Therefore, the coil interval is 1000 mm. A material, a dimension, and the like of the core 850 are the same as described above.

Figure 8:
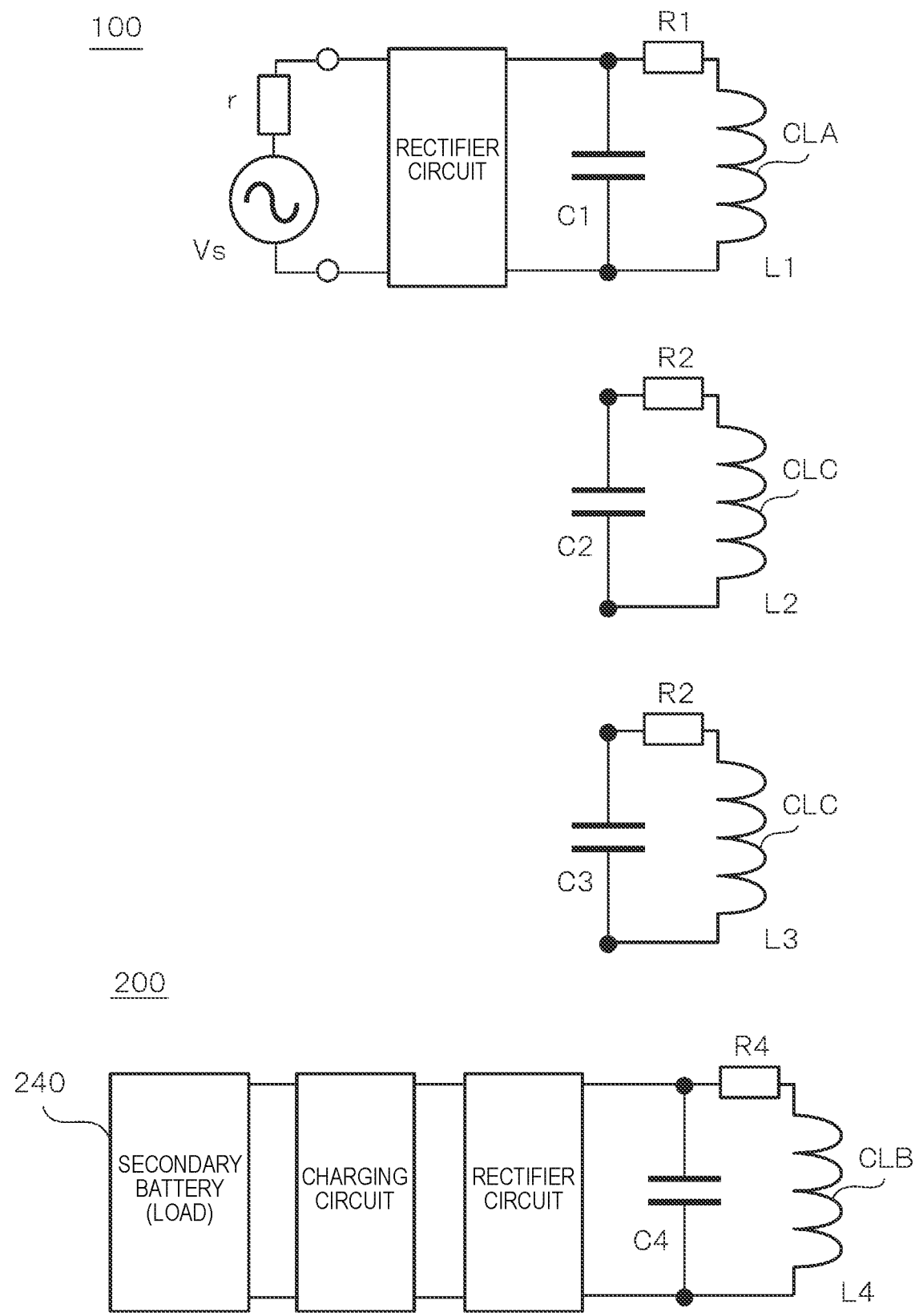
FIG. 8 is a diagram showing an equivalent circuit of the power transmission model.

FIG. 8 is a diagram showing an equivalent circuit of the power transmission model 15. In the equivalent circuit, the resonance circuit 152 of the power transmitting device 100 includes a power transmitting coil CLA having an inductance L1 as an inductance value and a capacitor CA having a capacitance C1 as a capacitance value. A resonance circuit including the first-stage relay coil CLC (the upper relay coil CLC in FIG. 7) includes a relay coil CLC having an inductance L2 as an inductance value and a capacitor CC having a capacitance C2 as a capacitance value. A resonance circuit including the second-stage relay coil CLC (the lower relay coil CLC in FIG. 7) includes a relay coil CLC having an inductance L3 as an inductance value and a capacitor CC having a capacitance C3 as a capacitance value. The resonance circuit 213 of the power receiving device 200 includes a power receiving coil CLB having an inductance L4 as an inductance value and a capacitor CB having a capacitance C4 as a capacitance value.

An inductance and a Q factor are derived (for example, detected or calculated) for each of the power transmitting coil CLA, the two relay coils CLC, and the power receiving coil CLB. FIG. 9 is a diagram showing a parameter table Tb indicating performance of the power transmitting coil CLA, the two relay coils CLC, and the power receiving coil CLB. The parameter table Tb shows inductances and Q factors when the ferrite 852 is present and when the ferrite 852 is absent. Here, a Q factor represents sharpness of a peak of resonance of a resonance circuit. When a Q factor increases, electric power transmission efficiency of a coil CL is improved. The Q factor satisfies a relationship of Q=ωL/R=1/ωCR, in which ω represents an angular frequency, R represents a resistance component, L represents an inductance component, and C represents a capacitance component. The angular frequency ω satisfies a relationship of ω=(1/LC)½, in which L represents an inductance component and C represents a capacitance component.

As shown in FIG. 9, an inductance value of the power transmitting coil CLA is about 400 μH when the ferrite 852 is absent, and is 414 μH when the ferrite 852 is present, which is slightly larger than the inductance value when the ferrite 852 is absent. The inductance values are substantially the same. Q factors of the power transmitting coil CLA are substantially the same at about 55 regardless the presence or absence of the ferrite 852.

An inductance value of the first-stage relay coil CLC is about 400 μH when the ferrite 852 is absent, and is 408 μH when the ferrite 852 is present, which is slightly larger than the inductance value when the ferrite 852 is absent. The inductance values are substantially the same. Q factors (Q2) of the first-stage relay coil CLC are substantially the same at about a value of 55 regardless the presence or absence of the ferrite 852.

An inductance value of the second-stage relay coil CLC is about 400 μH when the ferrite 852 is absent, and is 453 μH when the ferrite 852 is present, which is a little bit larger than the inductance value when the ferrite 852 is absent. Q factors (Q3) of the second-stage relay coil CLC are substantially the same at about a value of 55 regardless the presence or absence of the ferrite 852.

An inductance value of the power receiving coil CLB is about 40 μH when the ferrite 852 is absent, and is 291 μH when the ferrite 852 is present, which is seven times or more of the inductance value when the ferrite 852 is absent. A Q factor of the power receiving coil CLB is 10 or less when the ferrite 852 is absent, and is 69 and becomes large when the ferrite 852 is present.

For example, a processor of a personal computer (PC) executes a simulation using the power transmission model 15 based on the inductance values and the Q factors corresponding to the presence or absence of the core 850. The processor derives (for example, calculates) a mutual inductance M34 between the second-stage relay coil CLC and the power receiving coil CLB. The processor may calculate a coupling coefficient k34 between the second-stage relay coil CLC and the power receiving coil CLB using the mutual inductance M34 according to, for example, a formula (1) as follows:

$$k34 = M34/(L3 \cdot L4)^{1/2} \quad (1)$$

where $(L3 \cdot L4)^{1/2}$ represents a square root of $(L3 \cdot L4)$ and "·" represents a multiplication sign.

For example, the processor of the PC may calculate a maximum electric power transmission efficiency ηmax according to, for example, a formula (2) using the calculated coupling coefficient k34, Q3 indicating a Q factor of the second-stage relay coil CLC, and Q4 indicating a Q factor of the power receiving coil CLB.

[Mathematical Formula 1]

$$\eta\max = \frac{(k_{34}Q_{34})^2}{\left\{1 + \sqrt{1 + (k_{34}Q_{34})^2}\right\}^2} \quad (2)$$

Here, $Q34=(Q3 \cdot Q4)^{1/2}$. $(Q3 \cdot Q4)^{1/2}$ represents a square root of $(Q3 \cdot Q4)$ and "·" represents a multiplication sign. A subject of the calculation may be a processor of a general-purpose computer (for example, a personal computer (PC)).

The coupling coefficient k34 can also be expressed as shown in formula (3) using a Z parameter which is a transfer function.

[Mathematical Formula 2]

$$k^{34} = \frac{\text{Im}[Z^{34}]}{\sqrt{\text{Im}[Z^{33}]\text{Im}[Z^{44}]}} \quad (3)$$

As described above, the power receiving device 200 according to the present embodiment includes the weak magnetic body 851 that is disposed underwater and is a part of a housing formed of a weak magnetic material, the ferrite 852 (an example of a ferromagnetic body) that surrounds an outer side of the weak magnetic body 851 and is formed of a ferromagnetic material, and the power receiving coil CLB wound around an outer side of the ferromagnetic body.

As described above, the core (magnetic core) 850 that is a magnetic body is provided inside the power receiving coil CLB. The core 850 is formed by pasting the ferrite 852 that is a ferromagnetic material to a side surface of a cylindrical aluminum that is a weak magnetic body so as to cover at least a part of the side surface of the aluminum. Accordingly, the power receiving device 200 can increase an inductance and a Q factor of the power receiving coil CLB. Therefore, even when the AUV 800 has a weak magnetic housing, it is possible to prevent a decrease in transmission efficiency of a wireless underwater power transmission. In addition, a magnetic field from outside and magnetic field lines of a magnetic flux generated inside the ferrite 852 can be concentrated inside the ferrite, and can be prevented from moving toward the aluminum having conductivity. Accordingly, in a case where the core 850 is a housing of the AUV 800, even when aluminum is used as the housing, the power receiving device 200 can prevent heat generation of the aluminum caused by an eddy current.

Since the core 850 is provided, the number of magnetic fluxes passing through the power transmitting coil CLA and the power receiving coil CLB is increased. The power receiving device 200 can increase a coupling coefficient among coils and can improve transmission efficiency of an electromagnetic field (electric power). The ferrite 852 has conductivity and the conductivity of the ferrite 852 is lower than conductivity of seawater, so that attenuation of the electromagnetic field is reduced. Therefore, the power receiving device 200 can prevent a power transmission loss.

The power receiving device 200 may be provided in the AUV 800 serving as an underwater vehicle that moves underwater. In this case, the power receiving device 200 can improve underwater power transmission efficiency and charge the AUV 800 while the degree of freedom of a movement of the AUV 800 can be ensured.

Configuration Example 1 of Power Transmitting Coil Structure

In the embodiment described above, a ferrite that is a ferromagnetic material is pasted to an outer circumference of the core (magnetic core) 850 disposed inside the power receiving coil CLB. In a configuration example 1, a ferrite that is a ferromagnetic material is provided on an outer circumference of at least one of the power transmitting coil CLA and the two relay coils CLC in addition to the power receiving coil CLB.

Figure 10:
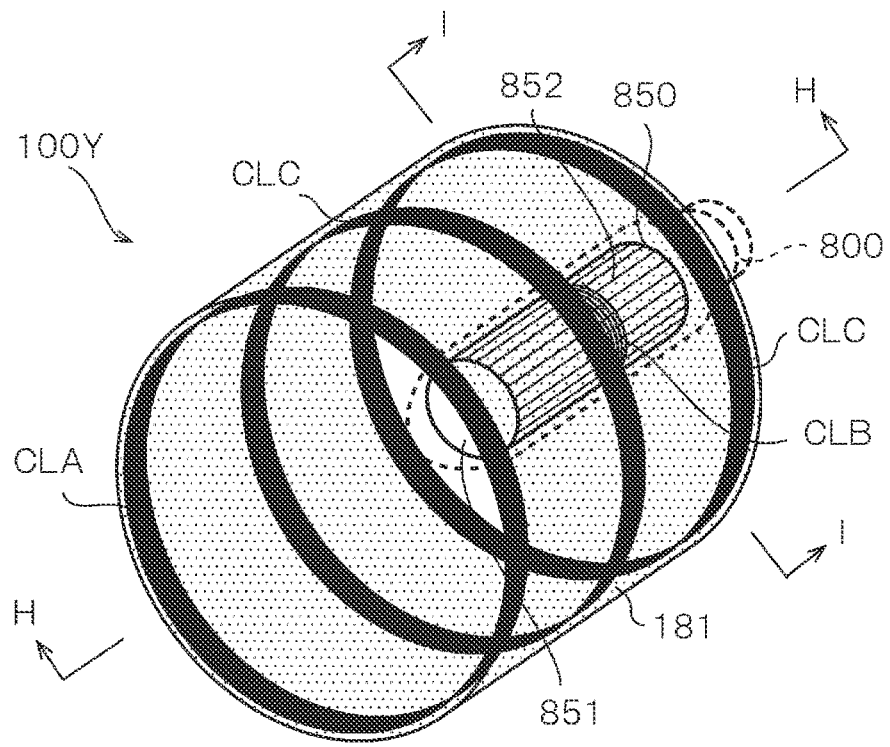
FIG. 10 is a perspective view showing a positional relationship between another power transmitting coil structure and another power receiving coil structure.
Figure 11:
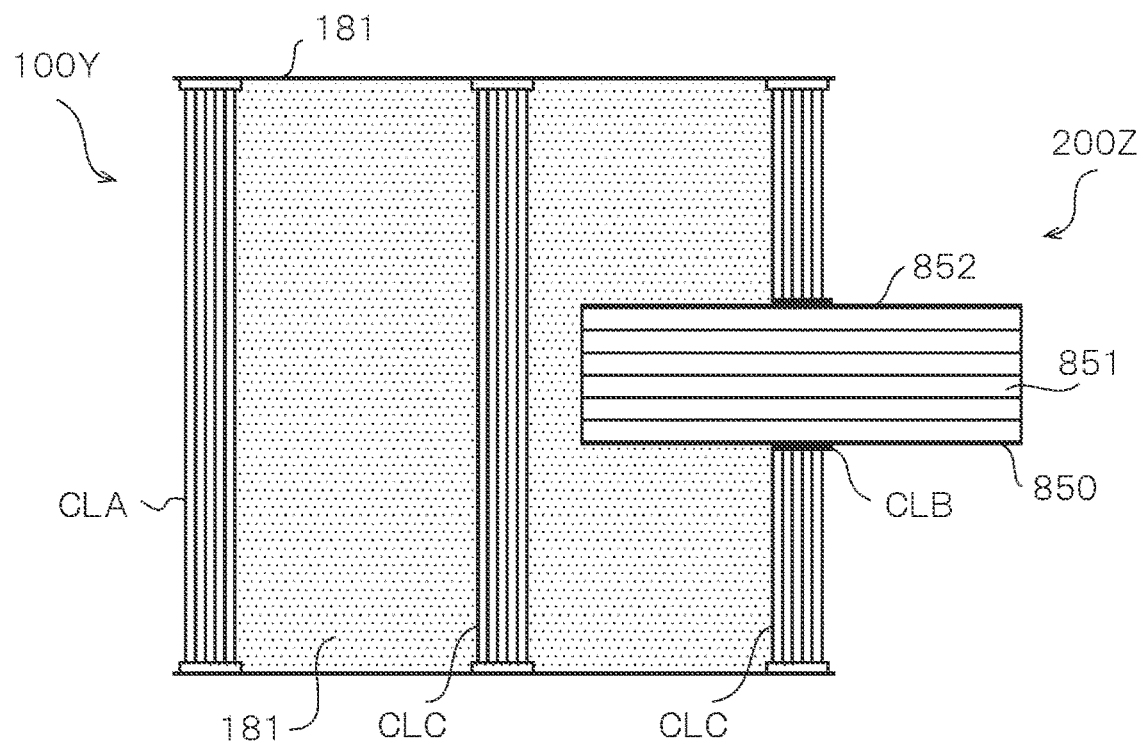
FIG. 11 is a cross sectional view showing the power transmitting coil structure and the power receiving coil structure as viewed in a direction indicated by arrows H-H in FIG. 10.
Figure 12:
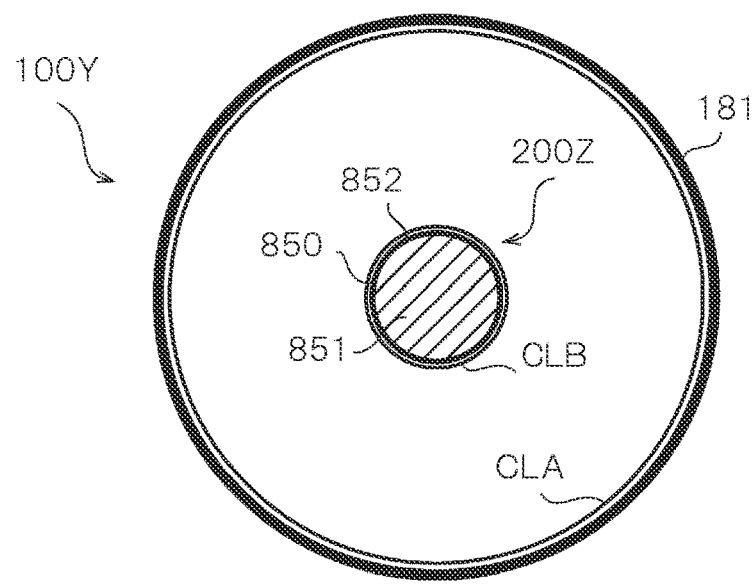
FIG. 12 is a cross-sectional view showing the power transmitting coil structure and the power receiving coil structure as viewed in a direction indicated arrows I-I in FIG. 10.

FIG. 10 is a perspective view showing a positional relationship between a power transmitting coil structure 100Y and the power receiving coil structure 200Z. The power transmitting coil structure 100Y is a structure related to a power transmitting coil provided in the power transmitting device 100, or a structure related to a power transmitting coil and a relay coil. FIG. 11 is a cross sectional view showing the power transmitting coil structure 100Y and the power receiving coil structure 200Z as viewed in a direction indicated by arrows H-H in FIG. 10. FIG. 12 is a cross sectional view showing the power transmitting coil structure 100Y and the power receiving coil structure 200Z as viewed in a direction indicated by arrows I-I in FIG. 10. In a power transmitting system, the same components will be denoted by the same reference numerals as those in the embodiment described above, and a description thereof will be omitted or simplified.

In the power transmitting coil structure 100Y, one power transmitting coil CLA and two relay coils CLC are arranged in a horizontal direction under seawater. The power transmitting coil structure 100Y has a structure in which a ferrite 181 that is a ferromagnetic body is pasted to an outer circumference of the power transmitting coil CLA and an outer circumference of each of the two relay coils CLC. That is, the ferrite 181 is formed into a cylindrical shape so as to cover the power transmitting coil CLA and the two relay coils CLC. That is, the ferrite 181 is disposed outside a circumference formed by each of the power transmitting coil CLA and the relay coils CLC. A thickness of the ferrite 181 may be 2 mm that is the same as the thickness of the ferrite 852 provided in the core 850 at a power receiving side.

In the power transmitting coil structure 100Y, magnetic fields generated in the power transmitting coil CLA and the relay coils CLC are less likely to leak to the outside since the ferrite 181 is disposed on an outer side of each of the power transmitting coil CLA and the relay coils CLC in a radial direction, the magnetic fields are concentrated inside the ferrite 181. In addition, a magnetic flux is generated inside the ferrite 181. Therefore, most magnetic field lines are gathered inside the power transmitting coil structure 100Y.

Similar to the embodiment described above, the power receiving coil CLB is formed by sealing the 10-turn electric wire 856 with the covering material 855. The covering material 855 may be a material having insulation, elasticity, and weather resistance, and for example, the covering material 855 may be rubber. The power receiving coil structure 200Z may be integrated by winding a molded power receiving coil CLB around an outer circumference of the core 850. An adhesive may be applied to a contact surface between the outer circumference of the core 850 and the covering material 855 of the power receiving coil CLB, so that the core 850 and the power receiving coil CLB are not separated from each other. Alternatively, the core 850 and the power receiving coil CLB may be integrated using a method other than bonding.

When the core 850 is provided inside the power receiving coil CLB, a magnetic field inside the power transmitting coil structure 100Y is concentrated inside the ferrite 852 and a magnetic flux is generated inside the ferrite 852. Therefore, in the power receiving coil structure 200Z, most magnetic field lines are gathered inside the power receiving coil CLB. Therefore, power transmission efficiency in the power transmitting system 10 is improved.

When the AUV 800 enters inner sides of the relay coils CLC arranged in two stages and arrives at a position where the relay coils CLC arranged in two stages and the power receiving coil CLB face each other on substantially the same plane, wireless power supply is started underwater. The same applies to a case where the AUV 800 enters from a power transmitting coil CLA side instead of a relay coil CLC side, and when the AUV 800 arrives at a position where the power transmitting coil CLA and the power receiving coil CLB face each other on substantially the same plane, wireless power supply is started underwater.

In this manner, the power transmitting device 100 in the configuration example 1 may transmit electric power to the AUV 800 having a housing 800z formed of a weak magnetic material underwater by using the power transmitting coil structure 100Y. The power transmitting device 100 may include one or more coils CL (an example of a transmitting coil) including the power transmitting coil CLA that transmits electric power to the power receiving coil CLB of the power receiving device 200 via a magnetic field, and the ferrite 852 that surrounds an outer side of a coil CL in a radial direction and is formed of a ferromagnetic material.

Accordingly, the ferrite 181 can prevent magnetic fields generated in the power transmitting coil CLA and the relay coils CLC from leaking to the outside of each of the power transmitting coil CLA and the relay coils CLC in the radial direction. That is, the magnetic fields generated in the power transmitting coil CLA and the relay coils CLC are concentrated inside the ferrite 181 and a magnetic flux is generated inside the ferrite 181. The ferrite 181 has conductivity and the conductivity of the ferrite 181 is lower than the conductivity of seawater, so that attenuation of an electromagnetic field can be reduced. Therefore, most magnetic field lines are gathered inside the power transmitting coil structure 100Y. As a result, the power transmitting device 100 can further improve power transmission efficiency. When the ferrite 181 that is firmly formed is pasted to an outer circumference of each of the power transmitting coil CLA and the relay coils CLC, the power transmitting device 100 can also function as a coupling body that couples the power transmitting coil CLA and the two relay coils CLC. In this case, the power transmitting device 100 may not be provided with bobbins bn around which the power transmitting coil CLA and the relay coils CLC are wound.

The power transmitting system 10 (an example of an underwater power supply system) in the configuration example 1 includes the power transmitting device 100 and the power receiving device 200. The power transmitting device 100 disposed underwater supplies electric power to the power receiving device 200. The power receiving device 200 may include the housing 800z formed of a weak magnetic material, the ferrite 852 (an example of a first ferromagnetic body) that surrounds an outer side of the housing 800z and is formed of a ferromagnetic material, and the power receiving coil CLB wound around an outer side of the ferrite 852. The power transmitting device 100 may include one or more coils CL including the power transmitting coil CLA that transmits electric power to the power receiving coil CLB of the power receiving device 200 via a magnetic field, and the ferrite 181 (an example of a second ferromagnetic body) that surrounds an outer side of the coil CL in a radial direction and is formed of a ferromagnetic material.

Accordingly, magnetic fields generated in the power transmitting coil CLA and the relay coils CLC are concentrated inside the outer ferrite 181 without being leaked to an outer side, and a magnetic flux is generated inside the outer ferrite 181. In addition, a magnetic field from outside and magnetic field lines of a magnetic flux generated inside the ferrite 181 is concentrated inside the ferrite 852 in the power receiving coil CLB, and do not move toward, for example, a housing formed of aluminum having conductivity. Accordingly, in a case where the core 850 is a housing of the AUV 800, even when a weak magnetic material such as aluminum is used as the housing, the power transmitting system 10 can prevent heat generation of the aluminum caused by an eddy current.

Configuration Example 2 of Power Transmitting Coil Structure

A case in which the power transmitting coil structure includes bobbins around which the power transmitting coil and relay coils are wound will be described. In a configuration example 2, the power transmitting coil structure has a structure in which a plurality of power transmitting coils and relay coils are coupled to one another via a coupling body.

Figure 13:
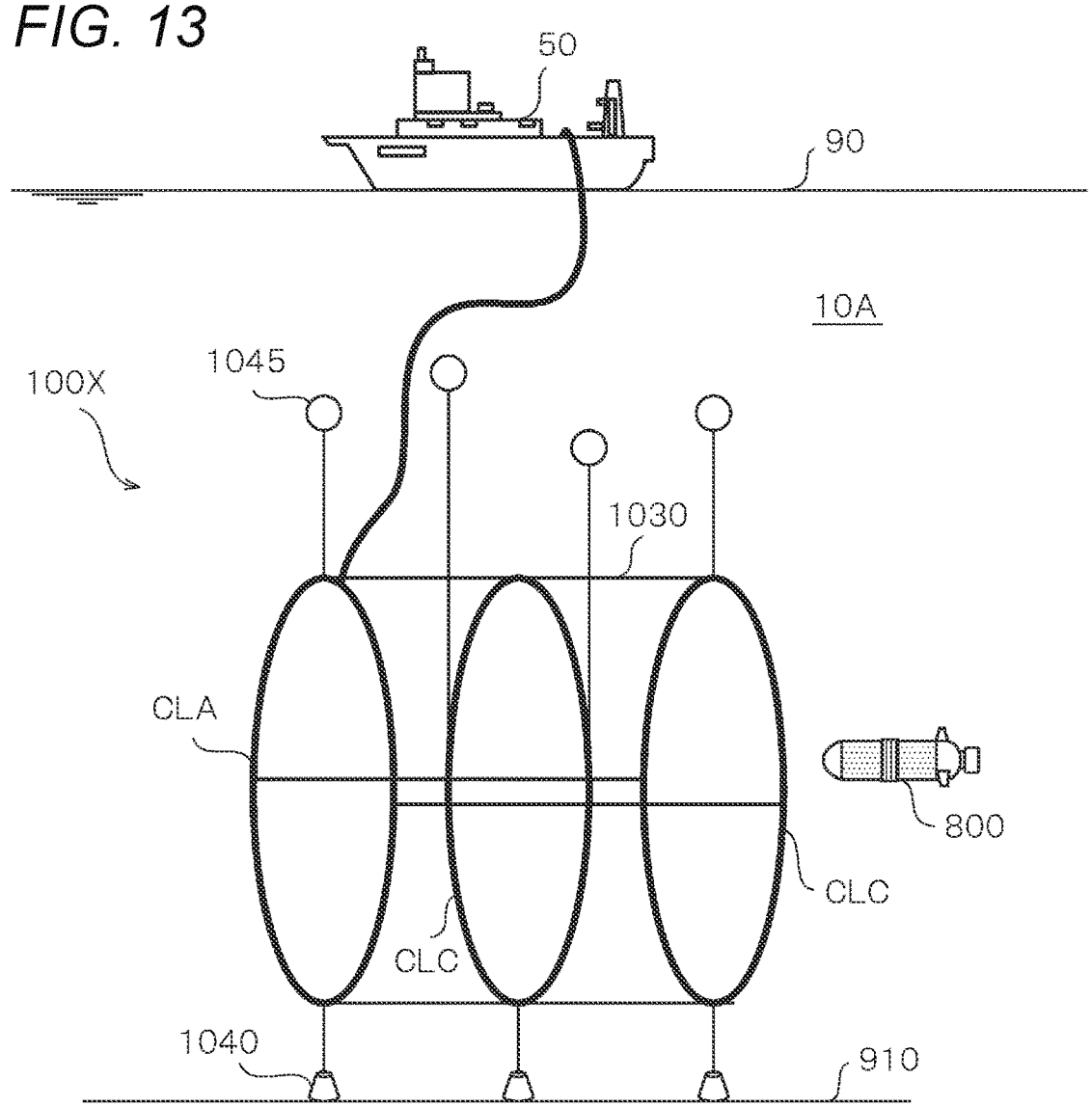
FIG. 13 is a perspective view schematically showing a power transmitting system including another power transmitting coil structure.

FIG. 13 is a perspective view schematically showing a power transmitting system 10A including a power transmitting coil structure 100X. The power transmitting coil structure 100X is a structure related to a power transmitting coil provided in the power transmitting device 100, or a structure related to a power transmitting coil and a relay coil. Coils CL are connected to a coupling body 1030. For example, the coils CL are arranged at equal intervals. A distance (coil interval) between adjacent coils CL is, for example, 5 m. For example, the coil interval has a length equal to about half of a diameter of a coil CL. In FIG. 13, the number of the coupling body 1030 is three, and the number of the coupling body 1030 is not limited to three. A weight 1040 is connected to a lower end side of each coupling body 1030. A buoy 1045 is connected to an upper end side of each coupling body 1030.

The weight 1040 can restrict a movement of the coupling body 1030, and can restrict a movement of each coil CL fixed to the coupling body 1030. Therefore, in the power transmitting system 10A, even when a water flow occurs underwater, since a movement of each coil CL is restricted by the weight 1040, a positional relationship among the power transmitting coil CLA, the relay coil CLC, and the power receiving coil CLB can be stabilized, and efficiency of a power transmission using coils CL can be prevented from decreasing.

Since the weight 1040 is connected to the lower end side of the coupling body 1030 and the buoy 1045 is connected to the upper end side of the coupling body 1030, the weight 1040 is located at a water bottom side, the buoy 1045 is located at a water surface side, and the coupling body 1030 can maintain a posture in which the coupling body 1030 is substantially horizontal to the water surface 90. Therefore, a plane defined by each coil CL is substantially perpendicular to the water surface 90, and electric power can be transmitted in a horizontal direction (a direction parallel to the water surface) using a magnetic field resonance method.

The weight 1040 may be removed from the coupling body 1030 during conveyance of the coupling body 1030, and the weight 1040 may be attached to the coupling body 1030 when conveyance of the coupling body 1030 is completed and the coupling body 1030 is installed at a predetermined position. Accordingly, it is easy to convey the coupling body 1030.

In this manner, in the power transmitting coil structure 100X, the AUV 800 easily enters an inner side of the power transmitting coil structure 100X, and a power supply is simplified. Since the power transmitting coil structure 100X is light and can be compactly housed, the power transmitting coil structure 100X can be easily conveyed.

The connector 1030 may be maintained at a posture in which the coupling body 1030 is in a state of floating under seawater, or may be maintained at a posture in which the coupling body 1030 is in a state of being fixed to pillars installed at the seabed.

A surface defined by each coil CL may be substantially horizontal to the water surface 90. In this case, the power transmitting system 10A can transmit electric power in a water depth direction (direction substantially perpendicular to the water surface) using a magnetic field resonance method.

Configuration Example 3 of Power Receiving Coil Structure

In the embodiment described above, the entire outer circumference of the core 850, that is, a side surface of the cylindrical weak magnetic body 851 is covered with the ferrite 852 over the entire circumference in the power receiving coil structure 200Z. In a power receiving coil structure in a configuration example 3, a part of the core is not covered with the ferrite.

Figure 14:
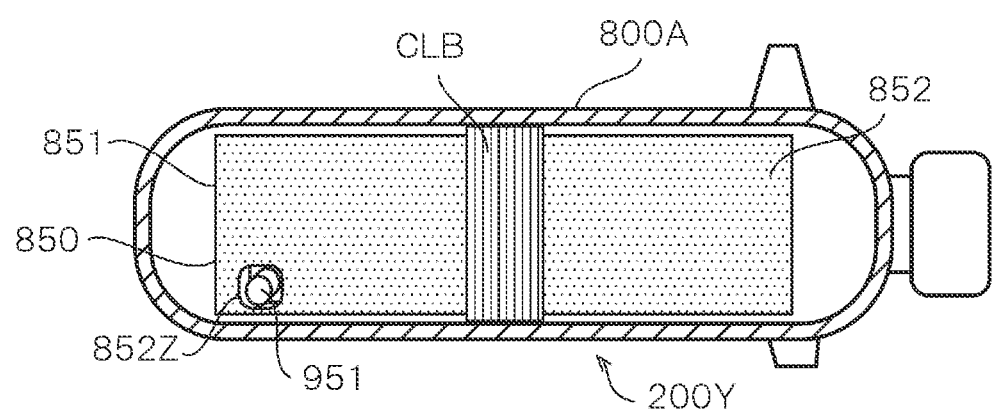
FIG. 14 is a cross sectional view showing an external appearance of an AUV equipped with another power receiving coil structure.

FIG. 14 is a cross sectional view showing an external appearance of the AUV 800 equipped with a power receiving coil structure 200Y. The power receiving coil structure 200Y is a structure related to a power receiving coil provided in the power receiving device 200. In the power receiving coil structure 200Y, an opening 852z is formed by cutting out a part of the ferrite 852 covering the weak magnetic body 851. The opening 852z exposes, for example, an imaging window of a camera 951 mounted on the AUV 800. Accordingly, it is possible to prevent an angle of view of the camera 951 from being blocked by the ferrite 852.

The number of openings formed in a side surface of the ferrite 852 is not limited to one, and a plurality of openings may be formed. The opening is not limited to expose the imaging window of the camera, and may be provided so as not to cover other various devices or components. For example, the opening may be formed at a position where a sound receiving surface of an ultrasonic sensor or the like is exposed.

As described above, the power receiving device 200 in the configuration example 3 may include the camera 951 (an example of a sensor). The camera 951 is disposed outside the housing of the AUV 800, and may detect and acquire data. The ferrite 852 may be absent at a position facing a sensor disposed outside the housing.

Accordingly, the power receiving device 200 can increase transmission efficiency of electric power transmitted from the power transmitting coil structure without interfering with an operation of a device such as the camera 951 or a sensor mounted on the AUV 800. As described above, the power receiving device 200 can prevent a decrease in detection accuracy of a sensor and improve power transmission efficiency, as compared with a case where the camera 951 is covered by the ferrite 852.

Although the embodiments have been described above with reference to the drawings, it is needless to say that the present disclosure is not limited to such examples. It will be apparent to those skilled in the art that various changes and modifications may be conceived within the scope of the claims. It is also understood that the various changes and modifications belong to the technical scope of the present disclosure. Constituent elements in the embodiments described above may be combined freely within a range not departing from the spirit of the present invention.

In the embodiment and configuration examples described above, the power receiving device 200 may be a power generator or the like installed on the seabed. In this case, the power receiving device 200 is fixedly installed underwater. In this manner, in a structure fixedly installed on the seabed, even when it is difficult to move and charge the structure, since the power transmitting device 100 approaches the power receiving device 200, underwater power transmission efficiency can be improved and the structure can be charged.

Although the power transmitting coil CLA and the plurality of relay coils CLC are arranged in a lateral direction (horizontal direction) under seawater in the embodiment and configuration examples described above, the power transmitting coil CLA and the plurality of relay coils CLC may be arranged in a longitudinal direction (vertical direction). When the power transmitting coil CLA and the plurality of relay coils CLC are arranged in a longitudinal direction, surfaces of the power transmitting coil CLA and the relay coils CLC are substantially parallel to the water surface. When the power transmitting coil CLA and the plurality of relay coils CLC are arranged in a longitudinal direction, the power receiving coils CLB mounted on the AUV 800 may also be mounted in a longitudinal direction so as to match with a magnetic field direction. That is, a surface of the power receiving coil CLB may be substantially parallel to the water surface. In a case of a power transmitting coil structure in which the power transmitting coil CLA and the relay coil CLC are coupled to each other via a coupling body, the AUV 800 can enter and exit the power transmitting coil structure in a horizontal direction even when the power transmitting coil structure is disposed in the longitudinal direction. On the other hand, in a case of a power transmitting coil structure in which the power transmitting coil CLA and the relay coil CLC are wound around bobbins bn, when the power transmitting coil structure is disposed in the longitudinal direction, the AUV 800 may enter an inside of the power transmitting coil structure from openings of each bobbin bn at an upper end and a lower end of the bobbin bn.

The processor may be freely and physically configured in the embodiment described above. When a programmable processor is used, processing content can be changed by changing a program, so that a degree of freedom in designing the processor can be increased. The processor may be configured with one semiconductor chip, or may be physically configured with a plurality of semiconductor chips. When the processor is configured with a plurality of semiconductor chips, controls in the embodiment described above may be respectively implemented by different semiconductor chips. In this case, it can be considered that one processor is configured with the plurality of semiconductor chips. The processor may be configured with a semiconductor chip and a member (such as a capacitor) having a different function. One semiconductor chip may be configured to implement a function of the processor and another function. A plurality of processors may be implemented by one processor.

The present application is based on Japanese Patent Application No. 2018-144125 filed on Jul. 31, 2018, and the contents of which are incorporated herein by reference.

INDUSTRIAL APPLICABILITY

The present disclosure is useful for a power receiving device, a power transmitting device, an underwater power supply system, and the like that can prevent a decrease in transmission efficiency of a wireless underwater power transmission even when the power receiving device includes a weak magnetic housing.

REFERENCE SIGNS LIST

10: power transmitting system
15: power transmission model
50: vessel
60: underwater vehicle
70: submarine
80: underwater excavator
90: water surface
95: water bottom
100: power transmitting device
100Z, 100Y: power transmitting coil structure
110: power supply
120: ADC
130: CPU
140: information communication unit
141: modulation and demodulation circuit
150: power transmitting circuit
151: driver
152: resonance circuit
181: ferrite
200: power receiving device
200Z, 200Y: power receiving coil structure
210: power receiving circuit
211: rectifier circuit
212: regulator
220: CPU
230: charging control circuit
240: secondary battery
250: information communication unit
251: modulation and demodulation circuit
280, 280A: power cable
800, 800A: AUV
800z: housing
850: core (magnetic core)
851: weak magnetic body
852: ferrite
855: covering material
856: electric wire
910: seabed
951: camera
1000C, 1000D: power supply stand
1030: coupling body
1040: weight
1045: buoy
1101: pillar
1200: power supply facility
bn, bn10, bn11: bobbin
CL: coil
CLA, CLA11, CLA12: power transmitting coil
CLB: power receiving coil
CLC, CLC11: relay coil
Tb: parameter table

The invention claimed is:
1. A power receiving device disposed underwater, the power receiving device comprising:
 a magnetic core including a housing formed of a non-magnetic material and a ferromagnetic body formed of a ferromagnetic material surrounding an outer side of the housing; and a power receiving coil formed by sealing an electric wire with a resin cover, wherein the electric wire wounds around an outer circumference of the magnetic core, wherein the power receiving device is an underwater vehicle configured to move underwater, and the power receiving coil wounds around the housing of the underwater vehicle.

2. The power receiving device according to claim 1, further comprising:

a sensor, wherein the sensor is disposed outside the housing, and is configured to detect and acquire data, and wherein the ferromagnetic body is absent at a position facing the sensor disposed outside the housing.

3. A power transmitting device configured to transmit electric power to a power receiving device comprising a housing formed of a non-magnetic material underwater, the power transmitting device comprising:

a transmitting coil group including a power transmitting coil and two relay coils, the transmitting coil group being configured to transmit electric power to a power receiving coil of the power receiving device via a magnetic field, wherein the power transmitting coil and the two relay coils are arranged in a horizontal direction and spaced apart from each other with a predefined interval; and a ferromagnetic body that surrounds an outer circumference of the power transmitting coil and an outer circumference of each of the two relay coils in a radial direction and is formed of a ferromagnetic material, wherein the power transmitting device starts power supply in response to the power receiving device entering an inner side of the transmitting coil group and reaching a position where the transmitting coil group and the power receiving coil of the power receiving device face each other when viewed from a direction perpendicular to a center axis of the power transmitting coil.

4. An underwater power supply system comprising:
a power transmitting device; and
a power receiving device, wherein the power transmitting device disposed underwater is configured to supply electric power to the power receiving device, wherein the power receiving device comprises:

a magnetic core including a housing formed of a non-magnetic material and a first ferromagnetic body formed of a first ferromagnetic material surrounding an outer side of the housing; and a power receiving coil formed by sealing an electric wire with a resin cover, wherein the electric wire wounds around an outer circumference of the magnetic core, and wherein the power transmitting device comprises:

a power transmitting coil and two relay coils configured to transmit electric power to the power receiving coil of the power receiving device via a magnetic field, wherein the power transmitting coil and the two relay coils are arranged in a horizontal direction and spaced apart from each other with a predefined interval; and a second ferromagnetic body that surrounds an outer circumference of the power transmitting coil and an outer circumference of each of the two relay coils in a radial direction and is formed of a second ferromagnetic material, wherein the power receiving device is an underwater vehicle configured to move underwater, and the power receiving coil wounds around the housing of the underwater vehicle.

5. The underwater power supply system according to claim 4, wherein the power transmitting device is structured in such a way that the power receiving device can move freely in both a backward direction and a forward direction inside the power transmitting device.

* * * * *